United States Patent
Couleur et al.

(10) Patent No.: US 11,594,967 B2
(45) Date of Patent: Feb. 28, 2023

(54) HYSTERETIC CURRENT CONTROL SWITCHING POWER CONVERTER WITH CLOCK-CONTROLLED SWITCHING FREQUENCY

(71) Applicant: Apple Inc., Cupertino, CA (US)

(72) Inventors: Michael Couleur, Rottach-Egern (DE); Nicola Rasera, Munich (DE); Nikola Jovanovic, Munich (DE); Pietro Gabriele Gambetta, Leghorn (IT)

(73) Assignee: Apple Inc., Cupertino, CA (US)

( * ) Notice: Subject to any disclaimer, the term of this patent is extended or adjusted under 35 U.S.C. 154(b) by 9 days.

(21) Appl. No.: 17/242,012

(22) Filed: Apr. 27, 2021

(65) Prior Publication Data
US 2022/0345040 A1    Oct. 27, 2022

(51) Int. Cl.
*H02M 3/158*    (2006.01)
*H02M 1/08*     (2006.01)
*H02M 1/00*     (2006.01)

(52) U.S. Cl.
CPC ......... *H02M 3/158* (2013.01); *H02M 1/0009* (2021.05); *H02M 1/0025* (2021.05); *H02M 1/08* (2013.01)

(58) Field of Classification Search
CPC ...... H02M 3/158; H02M 1/0009; H02M 1/08; H02M 1/0025
See application file for complete search history.

(56) References Cited

U.S. PATENT DOCUMENTS

| | | | |
|---|---|---|---|
| 6,853,174 B1 | 2/2005 | Inn | |
| 7,902,805 B2 | 3/2011 | Gibson et al. | |
| 8,587,265 B2* | 11/2013 | Nishimori | H02M 3/156 323/242 |
| 8,760,138 B2 | 6/2014 | Nishida et al. | |
| 9,203,301 B2 | 12/2015 | Tang et al. | |
| 9,893,621 B1 | 2/2018 | Newlin | |
| 10,116,207 B1* | 10/2018 | Malinin | H02M 3/157 |
| 10,404,168 B2 | 9/2019 | Trichy et al. | |
| 10,461,639 B1* | 10/2019 | Childs | H02M 3/156 |
| 2006/0043943 A1* | 3/2006 | Huang | H02M 3/158 323/222 |
| 2014/0217996 A1* | 8/2014 | Peker | H02M 3/1582 323/271 |
| 2017/0085168 A1* | 3/2017 | Laur | H02M 3/158 |

* cited by examiner

*Primary Examiner* — Kyle J Moody
*Assistant Examiner* — Jye-June Lee
(74) *Attorney, Agent, or Firm* — Kowert, Hood, Munyon, Rankin & Goetzel, P.C.; Erik A. Heter; Dean M. Munyon

(57) ABSTRACT

A hysteretic current control switching power converter with a clock-controlled switching frequency is disclosed. A power converter includes a switching circuit including a high side switch and a low side switch coupled to one another at a switching node, with an inductor being coupled between the switching node and a regulated supply voltage node. The power converter further includes a control circuit configured to alternately cause activation of the high side switch and the low side switch, wherein the control circuit is configured to activate the low side switch in response to a first voltage reaching peak threshold value, the first voltage corresponding to a current through the inductor. A ramp voltage circuit is configured to, in response to a clock signal, generate a ramp voltage, wherein the peak threshold value is based on the ramp voltage.

20 Claims, 6 Drawing Sheets

HYSTERETIC CURRENT CONTROL SWITCHING POWER CONVERTER WITH CLOCK-CONTROLLED SWITCHING FREQUENCY

BACKGROUND

Technical Field

This disclosure is directed to power converters, and more particularly, to switching power converters.

Description of the Related Art

A variety of electronic devices are now in daily use with consumers. Particularly, mobile devices have become ubiquitous. Mobile devices may include cell phones, personal digital assistants (PDAs), smart phones that combine phone functionality and other computing functionality such as various PDA functionality and/or general application support, tablets, laptops, net tops, smart watches, wearable electronics, etc.

Such mobile devices may include multiple integrated circuits, each performing different tasks. In some cases, circuits that perform different tasks may be integrated into a single integrated forming a system on a chip (SoC). The different functional units within a SoC may operate at different power supply voltage levels. In some designs, power supply or regulator circuits may be included in, or external to, the SoC to generate different voltage levels for the myriad functional units included in the SoC.

Regulator circuits may include one or more reactive circuit components. For example, individual regulator subassemblies may employ a combination of inductors or capacitors. The reactive circuit components may be fabricated on an integrated circuit with the regulator circuits, or they may be included as discrete components in a semiconductor package or circuit board.

SUMMARY

A hysteretic current control switching power converter with a clock-controlled switching frequency is disclosed. In one embodiment, a power converter includes a switching circuit having a high side switch and a low side switch coupled to one another at a switching node, with an inductor being coupled between the switching node and a regulated supply voltage node. The power converter further includes a control circuit configured to alternately cause activation of the high side switch and the low side switch, wherein the control circuit is configured to activate the low side switch in response to a first voltage reaching a peak threshold value, the first voltage corresponding to a current through the inductor. A ramp voltage circuit is configured to, in response to a clock signal, generate a ramp voltage, wherein the peak threshold value is based on the ramp voltage.

In one embodiment, a frequency control circuit is used to control generation of the ramp voltage by the ramp voltage circuit. In response to an edge of a clock signal (e.g., a rising edge when the clock transitions to an active phase), the frequency control circuit causes the ramp voltage circuit to be capacitively coupled to an input of the peak comparator. The ramp voltage may decrease as the capacitor discharges. When the ramp voltage intersects with a rising sense voltage that corresponds to the inductor current (with the intersection point corresponding to a peak threshold), the frequency control circuit may be reset by the tripping of the peak comparator. Thereafter, the low side switch may be activated, with the sense voltage falling in correspondence with a falling inductor current (and at a slope equal to the ramp voltage). When the sense voltage indicates that the inductor current has reached a valley target, a valley comparator trips. The tripping of the valley comparator may coincide with the next rising edge of the clock signal. Accordingly, the switching frequency of the high and low side switches may be effectively locked to the clock frequency.

BRIEF DESCRIPTION OF THE DRAWINGS

The following detailed description makes reference to the accompanying drawings, which are now briefly described.

DETAILED DESCRIPTION OF EMBODIMENTS

Figure 1:
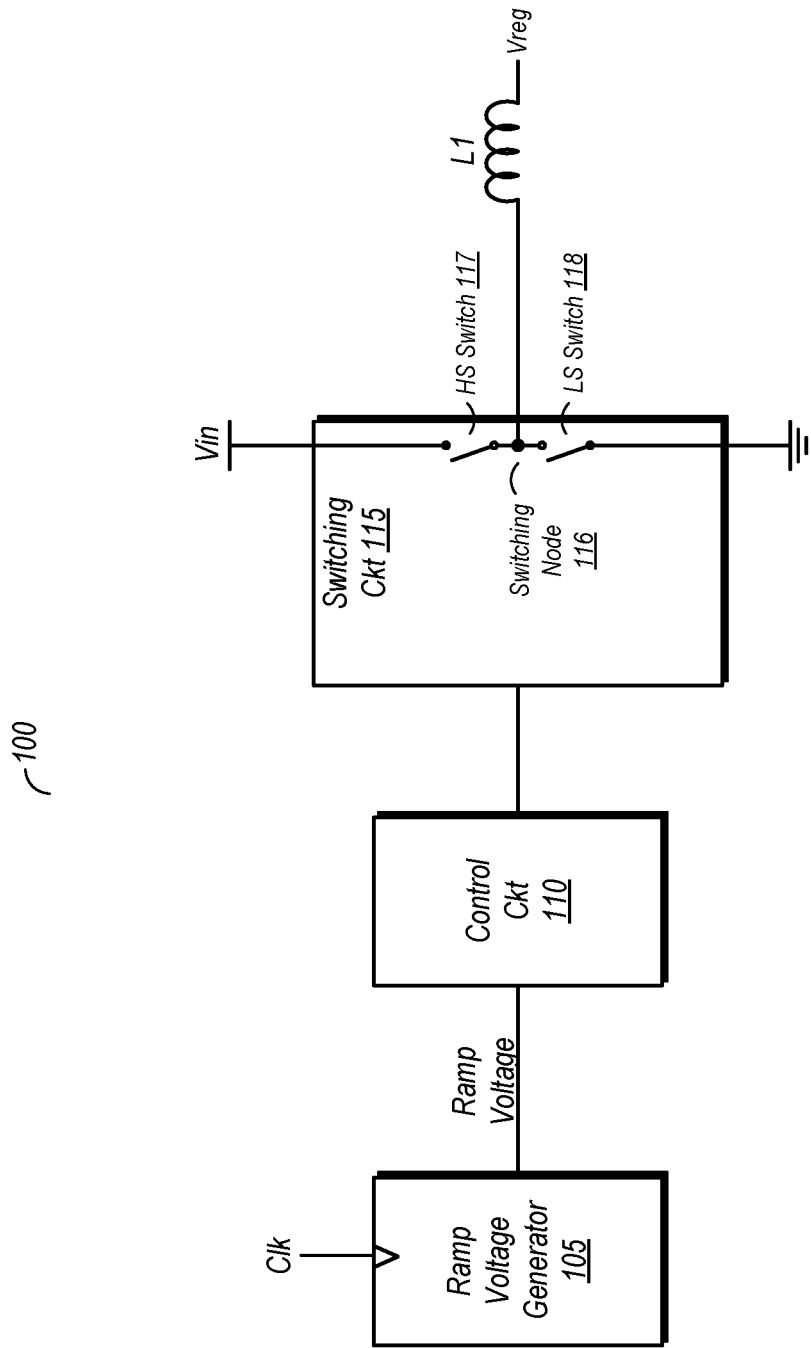
FIG. 1 is a block diagram of one embodiment of a power converter.

Hysteretic power converters use current mode control to keep an inductor current between upper and lower limits (sometimes referred to as "peak" and "valley," respectively). These types of power converters offer high bandwidth relative to other types of switching converters, as the peak/valley control doubles the sampling rate and thus increases its Nyquist limit. Hysteretic converters are often times used in low voltage applications.

Traditional hysteretic power converters use a bang-bang control methodology to operate switches (e.g., high side and low side switches of a buck converter), with the frequency of switching being dependent on the peak and valley thresholds and the changing inductor current. Thus, the frequency of switching of a traditional hysteretic power converter is not directly controlled, nor is its phase.

The present disclosure makes use of the insight that the ability to control the switching frequency may also lead to control of the phase response in a hysteretic converter while still maintaining its advantage of high bandwidth. Accordingly, the present disclosure is directed to a hysteretic power converter in which the switching frequency is controlled in accordance with a clock signal.

In one embodiment, a power converter according to the present disclosure includes a switching circuit, a control circuit, and a ramp voltage generator circuit. The switching circuit includes high and low side switches coupled to one another and an inductor at a switching node. Operation of the switching circuit is controlled by the control circuit and the ramp voltage generator circuit. In response to a transition of a clock signal from an inactive to an active phase (e.g., at a rising edge), the ramp voltage circuit generates a ramp voltage that is provided to an input of a peak current comparator in the control circuit. The beginning of generation of the ramp voltage (which may have a downward slope) occurs concurrently with the switching on of the high side switch. The peak current comparator is also coupled to receive a sense voltage that corresponds (e.g., is proportional) to a sensed inductor current.

When the ramp voltage and the sense voltage intersect (indicating that the inductor current has reached the peak current threshold), the peak comparator asserts a signal that causes the control circuit to turn off the high side switch and turn on the low side switch. This state continues until the inductor current reaches a valley threshold (as indicated by the sense voltage), after which the state of the high side and low side switches is reversed. Since the generation of the ramp voltage is performed in response to the clock signal, the peak threshold is thus also controlled by the clock signal. Accordingly, the switching frequency of the high and low side switches may be effectively locked to the frequency of the clock signal. Accordingly, the switching frequency, and thus the phase response of the power converter is thus controlled.

The discussion below provides additional details with respect to the operation of various embodiments of the power converter disclosed herein. The discussion begins with respect to a basic block diagram of one embodiment of a power converter according to the disclosure. Discussion of schematic diagrams follows, including a detailed description of one embodiment of a ramp generation circuit. Thereafter, the discussion continues with a timing diagram illustrating operation of one embodiment of a power converter followed by a flow diagram discussing one embodiment of a method of operation. The detailed description then concludes with discussion of an example system in which the power converter of the present disclosure may be implemented.

Hysteretic Power Converter Block Diagram:

Turning now to FIG. 1, a block diagram of one embodiment of a power converter is shown. In the embodiment shown, power converter 100 is a switching power converter, arranged as a buck converter in this particular, non-limiting example. Embodiments directed to boost converters are also possible and contemplated.

Power converter 100 as shown here includes a switching circuit 115 having a high side switch 117 and a low side switch 118. High side switch 117 and low side switch 118 are coupled to one another at a switching node 116, which is in turn coupled to an inductor L1. The other terminal of inductor L1 is coupled to an output node, Vreg, from which a regulated supply voltage is provided by power converter 100. Although not explicitly shown here, a load circuit may be coupled to receive the regulated supply voltage.

Switching of high side switch 117 and low side switch 118 is performed under the control of control circuit 110. More particularly, control circuit 110 in the embodiment shown may alternately switch the high side and low side switches, with one being turned on while the other is turned off. When high side switch 117 is turned on, switching node 116 is coupled to an input voltage, Vin, and thus inductor L1 is magnetized. When the low side switch 118 is turned on, switching node 116 is coupled to a reference (e.g., ground) node, and inductor L1 is demagnetized. In various embodiments, control circuit 110 may cause the switching of high side switch 117 and low side switch 118 to be performed in accordance with a pulse width modulation (PWM) mode, in which the duty cycles of the switches may be varied based on demands from the load circuit. Operation in a pulse frequency modulation (PFM) mode is also contemplated, in which the frequency of switching is varied based on load demand.

As will be discussed in further detail below, control circuit 110 may activate (e.g., closes) the high side switch 117 when the current through inductor L1 reaches a valley (e.g., minimum) threshold. Thereafter, inductor L1 is magnetized until the inductor current reaches a peak threshold. Upon current through inductor L1 reaching the peak threshold, control circuit 110 deactivates (e.g., opens) the high side switch 117 and activates low side switch 118.

In the embodiment shown, control circuit 110 determines the peak threshold based on a ramp voltage received from ramp voltage generator 105. The generation of the ramp voltage begins in response to receiving an edge of a clock signal such as the clock signal's rising edge occurring during a transition from an inactive to an active state. The ramp voltage generated by ramp voltage generator 105 may have a downward slope (e.g., decreasing over time). In various embodiments, the downward slope is equal to the downward slope of the inductor current during the demagnetization phase of operation. During the magnetization phase, the slope of the inductor current has an upward slope. When the upward slope of the current (as indicated by a corresponding sense voltage, to be discussed below) intersects with the downward slope of the ramp voltage, control circuit 110 deactivates high side switch 117 and activates low side switch 118 to begin the demagnetization phase. The demagnetization phase continues until the inductor current reaches a valley threshold, after which operation returns to the magnetization phase.

As noted above, the downward slope of the ramp voltage is equal to a downward slope of the inductor current during the demagnetization phase in one embodiment. Since downward sloping ramp voltage begins in response to a transition of the clock signal, the switching frequency of the power converter is thus effectively locked to the clock signal frequency. The term "locked" may be defined herein as a relationship between the clock signal frequency and the frequency of switching of the high and low side switches such that change to the former causes a proportional change to the latter. Details of how this locking is accomplished for certain embodiments is now discussed in reference to FIGS. 2 and 3.

Figure 2:
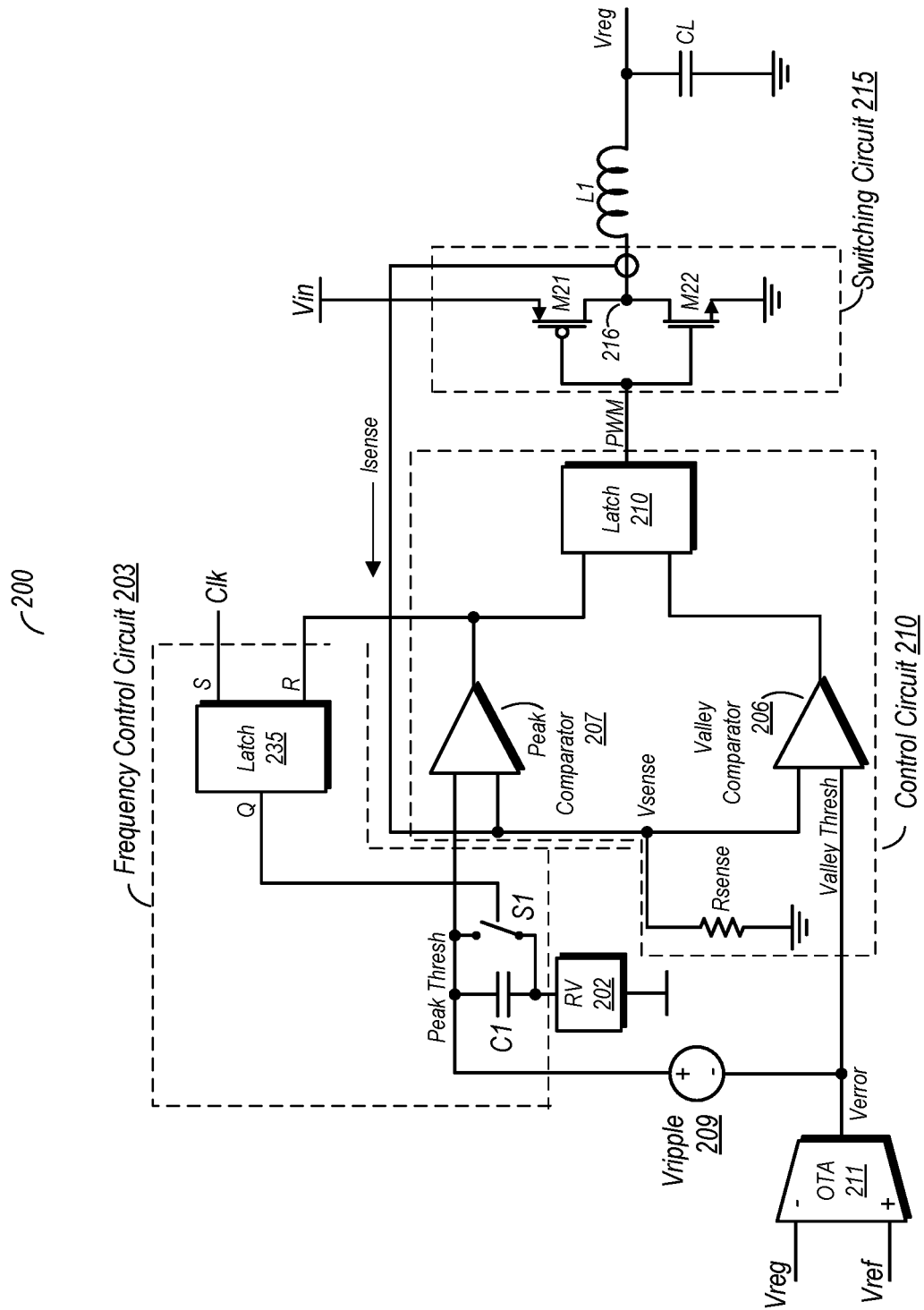
FIG. 2 is a schematic diagram of one embodiment of a power converter.

Schematic Diagrams of Hysteretic Power Converter Embodiments:

FIG. 2 is a schematic diagram of one embodiment of a power converter. In the embodiment shown, power converter 200 includes a control circuit 210, a switching circuit 215, and a ramp voltage generator circuit 202. Power converter 200 in the embodiment shown also includes a frequency control circuit that is coupled to the ramp voltage generator circuit 202 and thus initiates the generation of the ramp voltage. An operational transconductance amplifier (OTA) 211 is configured to generate an error signal based on a difference between the regulated supply voltage, Vreg, and a reference voltage, Vref. A ripple voltage 209 is configured to generate a ripple voltage, Vripple, The ripple voltage is an offset voltage that is added to the error voltage. Furthermore, the ripple voltage per the circuit shown here corresponds to a difference (but not necessarily the same as) between a peak threshold and a valley threshold.

Switching circuit 215 as shown in FIG. 2 may be implemented using transistors M21 and M22. In this particular embodiment, transistor M21 is a PMOS transistor that implements the high side switch, while M22 is an NMOS device that implements the low side switch. Embodiments in which the high side switch is also implemented using an NMOS transistor (and thus includes bootstrapping circuitry) are also possible and contemplated. In this embodiment, the source terminal of M21 is coupled to receive and input voltage, Vin. In embodiments in which power converter 200 is implemented as a buck converter, such as that shown here, the input voltage Vin is greater than the regulated supply voltage, Vreg. The source terminal of M22 in this embodiment is coupled to a ground (and more generally, a reference) node. Respective drain terminals of M21 and M22 are coupled to a switching node 216. An inductor L1 is coupled at one terminal to switching node 216, while its other terminal is coupled to the regulated supply voltage node labeled as Vreg. A load capacitance CL is also shown in the embodiment of FIG. 2.

Control circuit 210 in the embodiment shown includes valley comparator 206, peak comparator 207, and a sense resistor, Rsense. The sense resistor Rsense is arranged to generate a sense voltage, Vsense, based on a sensed inductor current, Isense. Although not explicitly shown here, the sensed inductor current Isense may be derived by a current sense amplifier looking at the inductor current. The sense voltage Vsense, being based on Isense, is proportional to, and varies with, the inductor current through L1. The sense voltage is provided to inputs of both valley comparator 206 and peak comparator 207 as an indication of a present value of the inductor current. A latch 213 is coupled to receive output signals from both valley comparator 206 and peak comparator 207, and generate a corresponding signal PWM which is used to switch between activation of the high side transistor M21 and low side transistor M22.

Valley comparator 206 in the embodiment shown is also coupled to receive the error voltage, Verror. While Verror may vary a small amount during operation, it may nevertheless be used to set a valley (or minimum) threshold that is used as a basis of comparison with the inductor sense current as indicated by the sense voltage, Vsense. When the sense voltage indicates that the inductor current has fallen to a value less than or equal to the valley threshold, valley comparator 206 may change the state of its output signal. Latch 213 may respond to this change of state by causing deactivation of M22 and, correspondingly, activation of M21.

Peak comparator 207 may perform similar operation relative to a peak (maximum) inductor current. The inductor current, as indicated by the sense voltage Vsense, is compared by peak comparator 207 to a peak threshold value on its other input. As the inductor current increases during the magnetizing phase (e.g., when M21 is active in this embodiment) the sense voltage Vsense increases correspondingly. When Vsense reaches/exceeds the peak threshold value, peak comparator 207 responds by changing the state of its output signal, causing latch 213 to deactivate the high side switch (M21) and activate the low side switch (M22).

In addition to causing a change from the magnetizing phase to the demagnetizing phase, the change of state of the output signal by peak comparator 207 is also received by frequency control circuit 203. In the embodiment shown, frequency control circuit 203 includes an SR latch 235 arranged to receive a clock signal on its set (S) input and the output signal from peak comparator 207 on its reset (R) input. The output of SR latch 235, Q, is coupled to switch S1. When Q is low in the embodiment shown, switch S1 is closed. When Q is high, switch S1 is open. Latch 235 thus opens switch S1 in response to an edge of clock signal when transitioning to an active (e.g., high) phase, and closes switch S1 in response to peak comparator 207 switching the state of its output signal.

Ramp voltage generator 202 in the embodiment shown generates a ramp voltage having a downward slope. The ramp voltage circuit 202 may be coupled directly to the peak threshold node (labeled "Peak Thresh") when switch S1 is closed. When switch S1 is open, ramp voltage generator is capacitively coupled, via capacitor C1, to the peak threshold node. The opening of switch S1 begins the downward slope of the ramp voltage. Accordingly, the beginning of the ramp voltage cycle is thus dependent on the clock signal. Therefore, the recurrence of the ramp voltage cycle has a frequency matching that of the clock signal.

When ramp voltage generator 202 is capacitively coupled to the peak threshold node, capacitor C1 discharges, and thus begins the downward slope of the ramp voltage. This ramp voltage is added to the ripple voltage on the peak threshold node. Since the ramp voltage is declining, the sum of the ramp voltage and ripple voltage is also declining. Meanwhile, since this is occurring during the magnetizing phase (when the high side switch is active), the inductor current is rising, with a corresponding rise in the sense voltage. At the point where the sense voltage, Vsense, and the voltage on the peak threshold node intersect, peak comparator 207 trips and thus changes the state of its output signal, causing a reset of latch 235. This also results in the end of the magnetizing phase and the beginning of the demagnetizing phase. As will be explained below, various component values of ramp voltage generator 202 are selected such that the end of the demagnetizing phase coincides with the rising edge of the clock signal. Therefore, frequency control circuit 203, in conjunction with ramp voltage generator 202, locks the switching frequency of the high and low side switches to the frequency of the clock signal.

Figure 3:
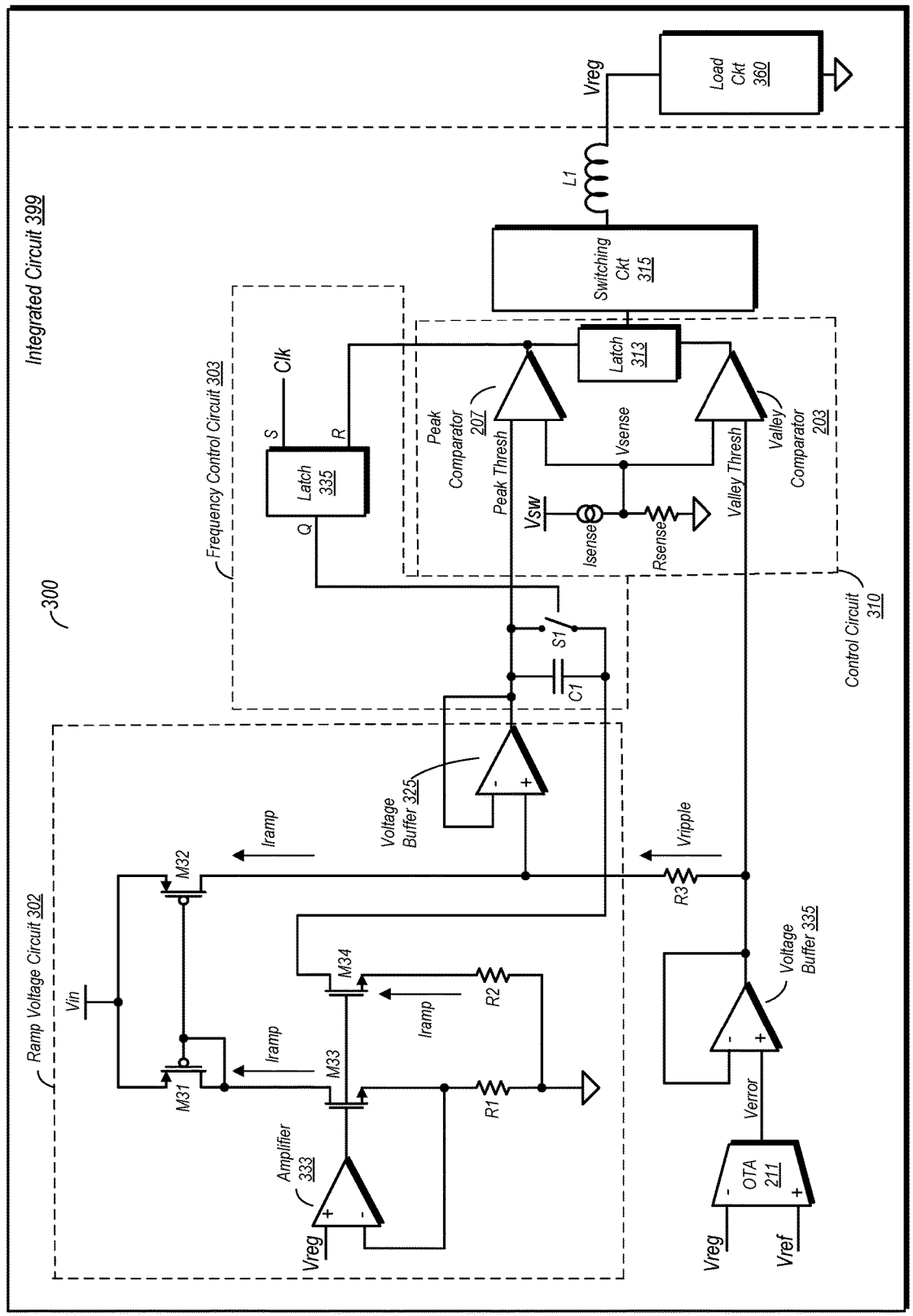
FIG. 3 is a schematic diagram of another embodiment of a power converter.

FIG. 3 is a schematic diagram of another embodiment of a power converter that is implemented on an integrated circuit. In the embodiment shown, power converter 300 is implemented on integrated circuit 399, which also includes a load circuit 360. Load circuit 360 may be any type of functional circuit block or unit that utilizes the regulated output voltage, Vreg, supplied by power converter 300.

Power converter 300 in the embodiment shown includes a control circuit 310 and a switching circuit 315, which may operate in the same manner as those described above with reference to FIG. 2. It is noted however that control and switching circuits having different arrangements than those explicitly discussed herein are possible and contemplated within the scope of this disclosure. The sense current source Isense as shown here may generated the sense current in a similar manner to that which was discussed above, e.g., using a current sense amplifier to derive the inductor current through L1.

In the embodiment shown, an output of OTA 211 is coupled to a non-inverting input of a voltage buffer 335. The output of voltage buffer 335 is coupled to its inverting input to provide negative feedback. The ripple voltage in this embodiment is generated across resistor R3, and is provided to a non-inverting input of a voltage buffer 325, which also includes an output fed back to the inverting input in a negative feedback configuration.

Ramp voltage circuit 302 in the embodiment shown includes an amplifier having non-inverting input coupled to receive the regulated output voltage, Vreg. The inverting input is coupled in a negative feedback arrangement to the source terminal of transistor M33. This voltage follower configuration effectively forces the regulated output voltage onto the top of resistor R1. The resistor R1 may have a value that is selected based on the values of the inductor L1, capacitor C1, and resistor Rsense. In particular, $$R1 = \frac{L1}{C1 \cdot Rsense}. \quad \text{(Eq. 1)}$$

Since the regulated supply voltage Vreg is forced onto R1, the ramp current may thus be expressed as:

$$Iramp = \frac{Vreg \cdot C1 \cdot Rsense}{L1}. \quad \text{(Eq. 2)}$$

R1 and R2 in the embodiment shown may have the same values, while M33 and M34 may be matched transistors. Accordingly, the ramp current may be mirrored to the circuit branch including R2 and M34, and thus transferred to the correspondingly coupled terminals of C1 and S1. Transistor M31 and M32 form a current mirror. Accordingly, the ramp current is also mirrored from M31 to M32, the source terminal of which is coupled to R3 as well as the non-inverting input of voltage buffer 325. This results in the generation of the ripple voltage, which is a product of the ramp current and the resistance of R3. The value of R3 may be selected in one embodiment as:

$$R3 = \frac{Tsw}{C1}, \quad \text{(Eq. 3)}$$

where Tsw is the period of the clock signal, or inverse of the clock signal frequency.

Accordingly, the ripple voltage may thus be expressed as follows:

$$Vripple = \frac{Vreg \cdot Rsense \cdot Tsw}{L}. \quad \text{(Eq. 4)}$$

As noted above, the ramp current Iramp is generated at a value proportional to Vreg divided by the resistance of R1, with the amplifier 333 forcing Vreg onto the top of R1 as shown in the drawing. The copy of the ramp current in the second branch of the circuit (R2 and M34) discharges capacitor C1 when switch S1 is open. The voltage on the peak threshold input of peak comparator 207 is compared to the inductor current that is fed back and translated into the sense voltage, Vsense. Meanwhile, the ramp current and the resistance of R3 sets a starting value for the voltage on the peak threshold input to peak comparator 207. When switch S1 is closed, the voltage across capacitor C1 is reset to zero, and the ramp voltage is reset to the voltage on top of R3.

As a result of the operation described above, frequency control circuit 303 is able to lock the switching frequency of power converter 300 to the frequency of the clock signal. More particularly, since the initial ramp voltage is imposed on the peak threshold node in response to the clock signal, the beginning of the downward slope of the ramp results from the setting of latch 335 and thus the opening switch S1. As noted above, when the rising sense voltage, Vsense (corresponding to rising inductor current during the magnetizing phase) intersects with the decreasing voltage on the peak threshold input (due to the downward sloping ramp voltage), peak comparator 207 trips (e.g., changes the state of its output signal). Responsive to peak comparator 207 tripping, latch 335 is reset while latch 313 switches the high and low side switches to end the magnetizing phase and begin the demagnetizing phase. The component values of the various resistors, capacitor C1, and inductor L1, may be selected such that the inductor current reaches the valley threshold at substantially the same time of the next rising clock edge. Furthermore, the component values may be selected such that the downward slope of the inductor current during the demagnetizing phase matches the downward slope of the ramp voltage during the magnetizing phase. In this manner, the switching frequency of power converter 300 is controlled, as is its phase response, while still maintaining the other advantages associated with hysteretic power converters.

Figure 4:
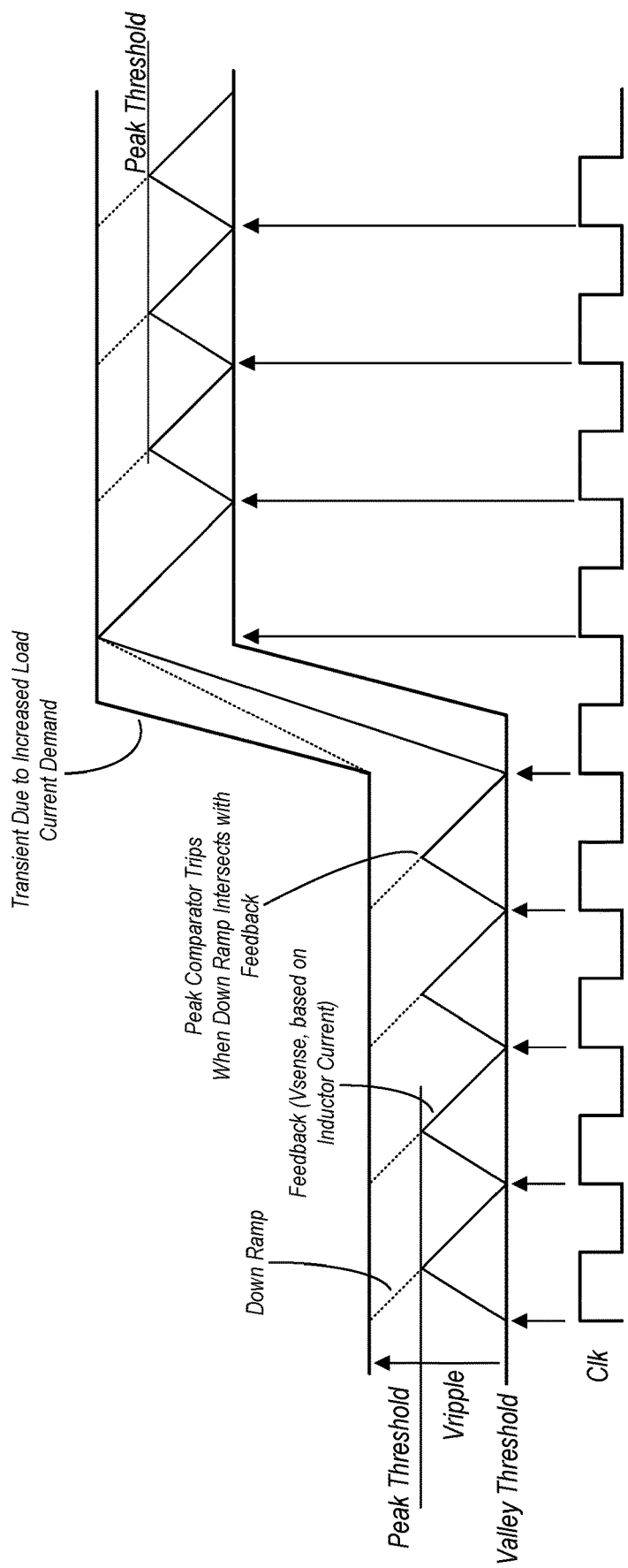
FIG. 4 is a waveform diagram illustrating operation of one embodiment of a power converter.

Graphic Illustration of Converter Operation:

FIG. 4 is a graphic illustration of the operation of one embodiment of a hysteretic power converter according to the disclosure. The operation depicted herein may be carried out by any of the embodiments discussed above. Furthermore, embodiments not explicitly disclosed herein but capable of carrying out the illustrated operation may be considered to fall within the scope of this disclosure.

In the illustrated example, the beginning of a down ramp voltage occurs at the rising edge of the clock signal, per the operation described above. The down ramp voltage is depicted here using a dashed line. The down ramp voltage continues to increase as the feedback signal (e.g., Vsense, based on the inductor current) continues to rise in value. The peak threshold occurs at the point where the down ramp voltage intersects with the rising feedback. In the various circuit embodiments discussed above, this intersection results in the tripping of a peak comparator, thereby ending the magnetizing phase, beginning the demagnetizing phase, and resetting a latch of a frequency control circuit. The feedback signal then begins to decline in value until reaching the valley threshold. Upon reaching the valley threshold, which occurs at the same time as the next rising edge of the clock signal, the valley comparator trips and thus ends the demagnetizing phase and causes the beginning of the next magnetizing phase. Meanwhile the rising edge of the clock signal once again causes the beginning of the downward sloping ramp voltage.

The example of FIG. 4 also illustrates a transient due to increased load current demand. In this example, both the ramp voltage and the feedback rise as the transient initially occurs. However, a power converter operating in accordance with this disclosure may nevertheless maintain the frequency lock described herein based on the clock signal. Accordingly, upon reaching the new steady state after the transient, the frequency lock is maintained and operation resumes in a manner similar to that before the transient occurred.

Figure 5:
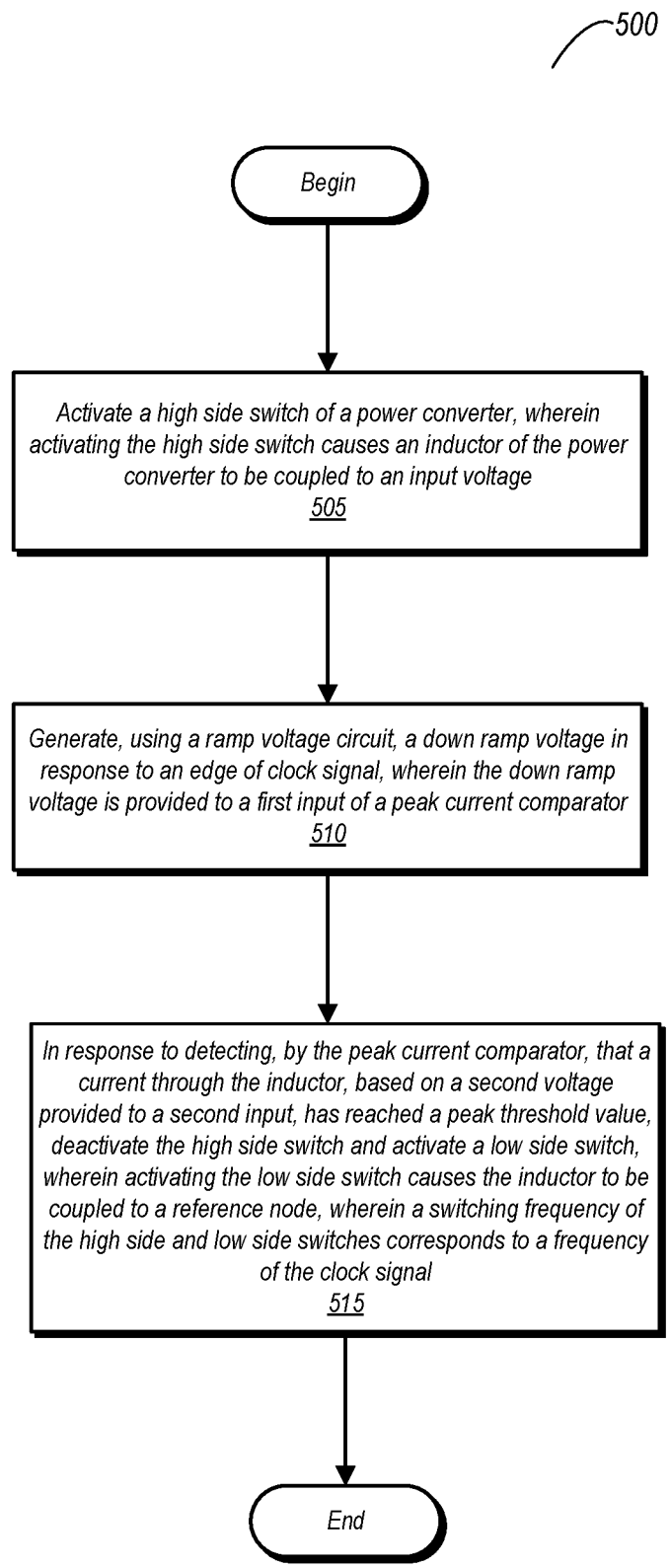
FIG. 5 is a flow diagram of one embodiment of a method for operating a power converter.

Method Flow Diagram:

FIG. 5 is a flow diagram illustrating one embodiment of a method for operating a power converter in accordance with this disclosure. Method 500 may be carried out using any of the hardware embodiments discussed above and any variation thereof. Power converters not explicitly disclosed herein but otherwise having the capability to carry out Method 500 are also considered to fall within the scope of this disclosure.

Method 500 begins with activating a high side switch of a power converter, wherein activating the high side switch causes an inductor of the power converter to be coupled to an input voltage (block 505). The method further includes generating, using a ramp voltage circuit, a ramp voltage in response to an edge of clock signal, wherein the ramp voltage is provided to a first input of a peak current comparator (block 510). In response to detecting, by the peak current comparator, that a current through the inductor, based on a second voltage provided to a second input, has reached a peak threshold value, the method further includes deactivating the high side switch and activating a low side switch, wherein activating the low side switch causes the inductor to be coupled to a reference node, wherein a switching frequency of the high side and low side switches corresponds to a frequency of the clock signal (block 515).

In various embodiments, the method includes directly coupling the ramp voltage circuit, using a frequency control circuit, to the first input of the peak current comparator by closing a switch in response to the peak current comparator indicating that the current through the inductor has reached a peak threshold value. Such method embodiments also include capacitively coupling the ramp voltage circuit, using the frequency control circuit, to the first input of the peak current comparator by opening the switch in response to receiving the edge of the clock signal.

Some embodiments of the method include generating the ramp voltage such that a slope of the ramp voltage is equal to a slope of the inductor current when the low side switch is activated. Embodiments are also possible and contemplated that include generating an error voltage, using an operational transconductance amplifier, based on a difference between a reference voltage and a regulated output voltage provided by the power converter. Various embodiments of the method include generating a sense voltage corresponding to the current through the inductor and providing the sense voltage to the second input of the peak current comparator and an input of a valley current comparator.

Figure 6:
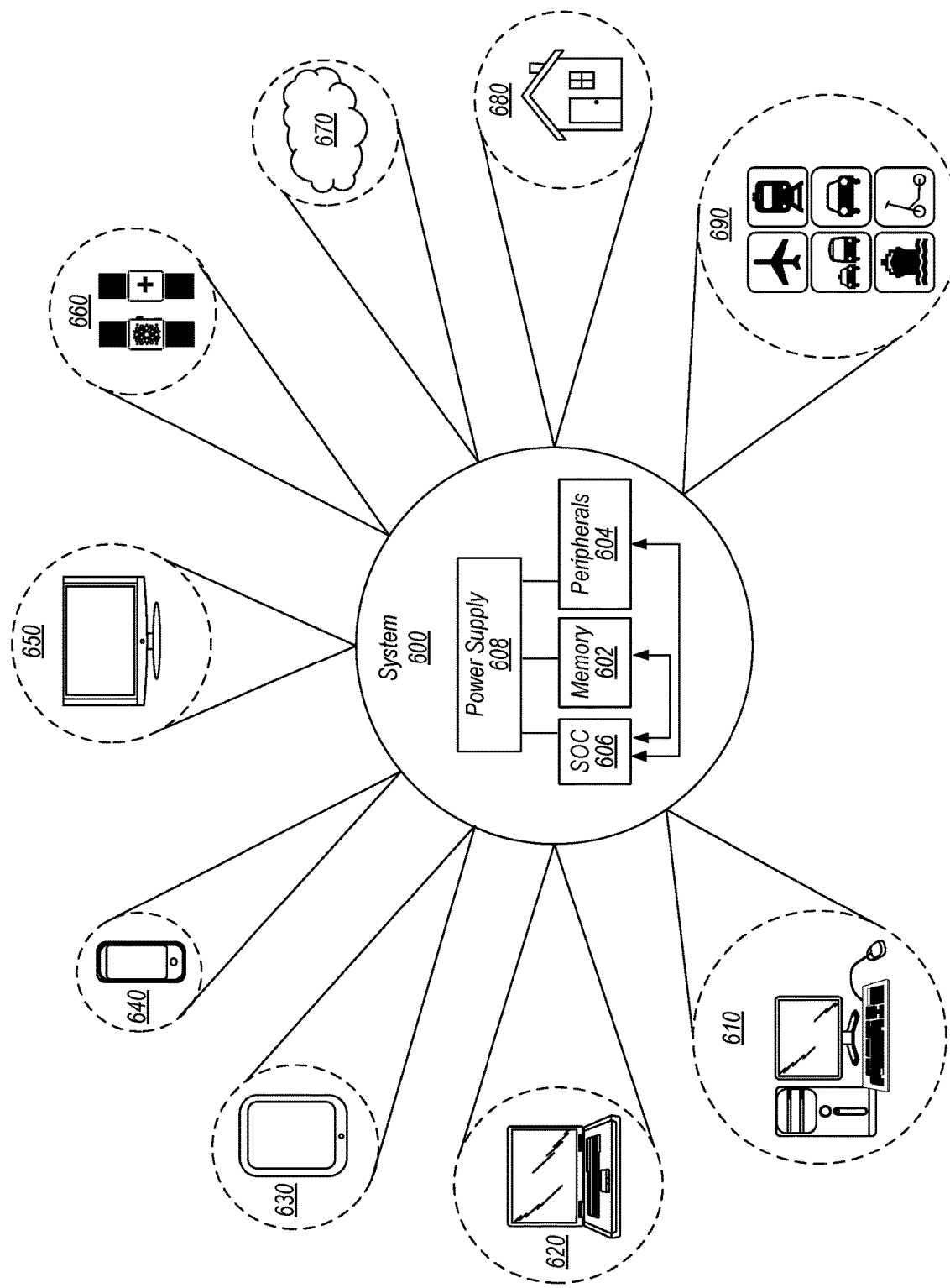
FIG. 6 is a block diagram of one embodiment of an example system.

Example System:

Turning next to FIG. 6, a block diagram of one embodiment of a system 600 is shown that may incorporate and/or otherwise utilize the methods and mechanisms described herein. In the illustrated embodiment, the system 600 includes at least one instance of a system on chip (SoC) 606 which may include multiple types of processing units, such as a central processing unit (CPU), a graphics processing unit (GPU), or otherwise, a communication fabric, and interfaces to memories and input/output devices. In various embodiments, system 600 may include one or integrated circuits that implement an embodiment of a power converter as described above.

A power supply 708 is also provided which supplies the supply voltages to SoC 606 as well as one or more supply voltages to the memory 602 and/or the peripherals 604. In various embodiments, power supply 608 represents a battery (e.g., a rechargeable battery in a smart phone, laptop or tablet computer, or other device). In some embodiments, more than one instance of SoC 606 is included (and more than one external memory 702 is included as well).

The memory 602 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 604 include any desired circuitry, depending on the type of system 600. For example, in one embodiment, peripherals 604 includes devices for various types of wireless communication, such as Wi-Fi, Bluetooth, cellular, global positioning system, etc. In some embodiments, the peripherals 604 also include additional storage, including RAM storage, solid state storage, or disk storage. The peripherals 604 include user interface devices such as a display screen, including touch display screens or multi-touch display screens, keyboard or other input devices, microphones, speakers, etc.

As illustrated, system 600 is shown to have application in a wide range of areas. For example, system 600 may be utilized as part of the chips, circuitry, components, etc., of a desktop computer 610, laptop computer 620, tablet computer 630, cellular or mobile phone 640, or television 650 (or set-top box coupled to a television). Also illustrated is a smartwatch and health monitoring device 660. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 600 may further be used as part of a cloud-based service(s) 670. For example, the previously mentioned devices, and/or other devices, may access computing resources in the cloud (i.e., remotely located hardware and/or software resources). Still further, system 600 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 6 is the application of system 600 to various modes of transportation. For example, system 600 may be used in the control and/or entertainment systems of aircraft, trains, buses, cars for hire, private automobiles, waterborne vessels from private boats to cruise liners, scooters (for rent or owned), and so on. In various cases, system 600 may be used to provide automated guidance (e.g., self-driving vehicles), general systems control, and otherwise. These any many other embodiments are possible and are contemplated. It is noted that the devices and applications illustrated in FIG. 6 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A power converter, comprising:
   a switching circuit including a high side switch and a low side switch coupled to one another at a switching node;
   an inductor coupled between the switching node and a regulated supply voltage node; and
   a control circuit configured to alternately cause activation of the high side switch and the low side switch, wherein the control circuit is configured to activate the low side switch in response to a first voltage reaching a peak threshold value, the first voltage corresponding to a current through the inductor; and
   a ramp voltage circuit configured to, in response to a clock signal, generate a ramp voltage, wherein the peak threshold value is based on the ramp voltage;
   wherein the control circuit includes:
      a peak comparator coupled to receive the first voltage, and further coupled to receive a second voltage corresponding to the peak threshold value, wherein the second voltage is based on the ramp voltage and a ripple voltage; and
      a frequency control circuit coupled between the ramp voltage circuit and an input of the peak comparator that is coupled to receive the first voltage.

2. The power converter of claim 1, wherein the ramp voltage decreases over time, and wherein the control circuit is configured to cause the peak comparator to switch a state of its output signal in response to the ramp voltage intersecting with the first voltage.

3. The power converter of claim 1, wherein the ripple voltage is based on an offset voltage and an error voltage that corresponds to a difference between a reference voltage and a current value of a regulated output voltage provided by the power converter.

4. The power converter of claim 1, wherein the frequency control circuit is coupled to receive the clock signal and is configured to cause the control circuit to lock a frequency of switching of the high side switch and low side switch to a frequency corresponding to a frequency of the clock signal.

5. The power converter of claim 1, wherein the first voltage is generated using a sense current value and a resistor, wherein the sense current value corresponds to the current through the inductor.

6. The power converter of claim 1, wherein the ramp voltage circuit is configured to generate the ramp voltage such that a slope of the ramp voltage is equal to a slope of the inductor current when the low side switch is activated.

7. The power converter of claim 1, further comprising a valley current comparator having a first input coupled to receive the first voltage and a second input coupled to receive an error voltage corresponding to a difference between a reference voltage and a current value of a regulated output voltage provided by the power converter, wherein the valley current comparator is configured cause deactivation of the low side switch in response to the first voltage indicating that the current through the inductor has reached a valley threshold that is based on the error voltage.

8. The power converter of claim 7, further comprising an operational transconductance amplifier configured to generate the error voltage based on the difference between the reference voltage and the current value of a regulated output voltage provided by the power converter.

9. The power converter of claim 1, wherein the ramp voltage circuit is configured to generate a ramp current using a current voltage of the regulated supply voltage node and further configured to generate the ramp voltage using the ramp current, wherein the ramp current is used to discharge a capacitor.

10. The circuit of claim 1, wherein the frequency control circuit is configured to directly couple the ramp voltage circuit to the input of the peak comparator by closing a first switch in response to the peak comparator generating an indication that the current through the inductor has reached a peak threshold value.

11. The circuit of claim 10, wherein the frequency control circuit is configured to capacitively coupled the ramp voltage circuit to the input of the peak comparator by opening the first switch in response to receiving an edge of the clock signal.

12. A method comprising:
   activating a high side switch of a power converter, wherein activating the high side switch causes an inductor of the power converter to be coupled to an input voltage;
   generating, using a ramp voltage circuit, a ramp voltage in response to an edge of a clock signal, wherein the ramp voltage is provided to a first input of a peak current comparator;
   directly coupling the ramp voltage circuit, using a frequency control circuit, to the first input of the peak current comparator by closing a first switch in response to the peak current comparator indicating that the current through the inductor has reached a peak threshold value;
   capacitively coupling the ramp voltage circuit, using the frequency control circuit, to the first input of the peak current comparator by opening the first switch in response to receiving the edge of the clock signal;
   in response to detecting, by the peak current comparator, that a current through the inductor, based on a second voltage provided to a second input, has reached the peak threshold value, deactivating the high side switch and activating a low side switch, wherein activating the low side switch causes the inductor to be coupled to a reference node;

wherein a switching frequency of the high side and low side switches corresponds to a frequency of the clock signal.

13. The method of claim 12, further comprising generating the ramp voltage such that a slope of the ramp voltage is equal to a slope of the inductor current when the low side switch is activated.

14. The method of claim 12, further comprising generating an error voltage, using an operational transconductance amplifier, based on a difference between a reference voltage and a regulated output voltage provided by the power converter.

15. The method of claim 12, further comprising:
generating a sense voltage corresponding to the current through the inductor; and
providing the sense voltage to the second input of the peak current comparator and an input of a valley current comparator.

16. A circuit comprising:
an inductor coupled between a switching node and a regulated supply voltage node;
a switching circuit having a high side switch coupled between the switching node and an input voltage node and a low side switch coupled between the switching node and a reference node;
a control circuit configured to alternately activate the high side and low side switches based on a sensed current through the inductor, wherein the control circuit includes:
a peak current comparator having a first input coupled to receive a peak threshold voltage and a second input coupled to receive a sense voltage, wherein the peak current comparator is configured to assert a peak indication in response to detecting that the sense voltage is greater than or equal to the peak threshold;
a ramp generation circuit configured to generate a ramp voltage, wherein the control circuit is configured to deactivate the high side switch and activate the low side switch in response to a sense voltage reaching a peak threshold voltage, wherein the peak threshold voltage is dependent on the ramp voltage, and wherein the sense voltage corresponds to the sensed current through the inductor; and
a frequency control circuit configured to cause the ramp voltage circuit to begin generation of the ramp voltage in response to a transition of a clock signal from an inactive state to an active state.

17. The circuit of claim 16, wherein the control circuit further includes
a valley current comparator having a first input coupled to receive a valley threshold voltage and a second input coupled to receive the sense voltage, wherein the valley current comparator is configured to generate a valley indication in response to determining that the sense voltage is less than or equal to the valley threshold.

18. The circuit of claim 17, wherein the control circuit further includes a latch configured to cause activation of the high side switch and deactivation of the low side switch in response to the valley current comparator generating the valley indication and further configured to cause activation of the low side switch and deactivation of the high side switch in response to the peak current comparator generating the peak indication.

19. The circuit of claim 16, wherein the frequency control circuit includes:
a latch having a first input coupled to receive the clock signal and a second input coupled to receive a peak indication from the control circuit;
a switch coupled between the ramp generation circuit and a peak threshold node in the control circuit, wherein the latch is configured to cause the switch to open in response to a transition of a clock signal from an inactive state to an active state and further configured to cause the switch to close in response to receiving the peak indication; and
a capacitor coupled in parallel with the switch.

20. The circuit of claim 16, wherein the frequency control circuit is configured to cause the control circuit to lock a frequency of switching the high side switch and low side switch to a frequency corresponding to a frequency of the clock signal.

* * * * *